(12) United States Patent
Das et al.

(10) Patent No.: US 7,325,051 B2
(45) Date of Patent: Jan. 29, 2008

(54) INTEGRATED STORAGE APPLIANCE

(75) Inventors: Sanjoy Das, Palo Alto, CA (US); Balakrishna R. Iyer, San Jose, CA (US); John T. Flynn, Morgan Hill, CA (US); Vahit H. Hacigumus, San Jose, CA (US); Dante A. Aubert, San Jose, CA (US); Lu Nguyen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 10/259,034

(22) Filed: Sep. 26, 2002

(65) Prior Publication Data

US 2003/0105852 A1    Jun. 5, 2003

Related U.S. Application Data

(60) Provisional application No. 60/333,036, filed on Nov. 6, 2001.

(51) Int. Cl.
G06F 15/173 (2006.01)
G06F 15/16 (2006.01)
H04L 12/28 (2006.01)

(52) U.S. Cl. .................. 709/223; 709/201; 709/214; 709/321; 370/251; 370/254

(58) Field of Classification Search ............ 709/223, 709/217, 201–203, 242; 710/20, 52; 370/230, 370/235, 400, 902, 218; 711/112, 114
See application file for complete search history.

(56) References Cited

U.S. PATENT DOCUMENTS

| | | | |
|---|---|---|---|
| 5,655,077 A | 8/1997 | Jones et al. | |
| 5,787,418 A | 7/1998 | Hibbetts et al. | |
| 5,924,089 A | 7/1999 | Mocek et al. | |
| 6,108,651 A | 8/2000 | Guha | |
| 6,223,239 B1 * | 4/2001 | Olarig | 710/312 |
| 6,401,216 B1 * | 6/2002 | Meth et al. | 714/16 |
| 6,496,833 B1 | 12/2002 | Goldberg et al. | |
| 6,499,026 B1 | 12/2002 | Rivette et al. | |
| 6,665,304 B2 * | 12/2003 | Beck et al. | 370/401 |
| 6,738,077 B1 | 5/2004 | Wendker et al. | |
| 6,760,720 B1 | 7/2004 | De Bellis | |
| 6,850,252 B1 * | 2/2005 | Hoffberg | 715/716 |
| 6,854,034 B1 * | 2/2005 | Kitamura et al. | 711/112 |
| 6,880,086 B2 * | 4/2005 | Kidder et al. | 713/191 |
| 6,952,714 B2 * | 10/2005 | Peart | 709/203 |
| 6,965,911 B1 * | 11/2005 | Coffman et al. | 709/201 |

(Continued)

OTHER PUBLICATIONS

Hakan Hacigumus et al., Providing Database as a Service, Very Large Data Base Endowment, 14 pages.

*Primary Examiner*—David Wiley
*Assistant Examiner*—Jude J Jean-Gilles
(74) *Attorney, Agent, or Firm*—Sawyer Law Group LLP

(57) ABSTRACT

A system and method for providing an integrated storage appliance is disclosed. The storage appliance includes a storage subsystem, a process cluster coupled to the storage subsystem, and a customizable software stack that includes storage-access application so executed by the processor cluster, wherein subsystem, processor cluster and software stack are integrated such that the storage appliance exhibits greater combined reliability, higher availability, and higher serviceability characteristics than would be provided by a sum of the characteristics unintegrated components.

2 Claims, 13 Drawing Sheets

U.S. PATENT DOCUMENTS 7,023,811 B2 * 4/2006 Pinto .................... 370/254
7,080,070 B1 7/2006 Gavarini
2004/0024616 A1 2/2004 Spector et al.
2005/0149542 A1 7/2005 Cosic
2005/0229154 A1 10/2005 Hiew et al.

* cited by examiner

Enterprise Storage Server

FIG. 13

INTEGRATED STORAGE APPLIANCE

CROSS-REFERENCE TO RELATED APPLICATIONS

This application claims priority under 35 U.S.C. § 119(e) the benefit of U.S. Provisional Patent Application Ser. No. 60/333,036, entitled "Integrated Storage Appliance," filed on Nov. 6, 2001.

FIELD OF THE INVENTION

The present invention relates to storage servers, and more particularly to an integrated application and storage server that supports web-based access.

BACKGROUND OF THE INVENTION

One of the most significant challenges facing IT executives today is data management. Companies across all industries are launching new business-critical applications—for example, electronic business (e-business), enterprise resource planning and business intelligence. How easily this information can be shared across the entire enterprise and beyond, including customers, suppliers and partners is of critical importance. Depending on the particular application the enterprise is providing, a combination of computer systems, including web servers, application servers, storage subsystems and software, must be closer to deliver the application to clients.

An application server is a computer in an intranet/Internet environment that performs the data processing necessary to deliver up-to-date information as well as process information for Web clients. The application server sits along with or between a Web server, the databases and legacy applications, to enable a browser-based application to link to multiple sources of information. One of the first uses of an application server was to tie database contents to HTML pages. In large sites, separate application servers link to the Web servers and typically provide load balancing and fault tolerance for high-volume traffic. For small Web sites, the application server processing is often performed by the Web server.

Recently, storage subsystems have been used to offload the storage intelligence from host servers in order to free processing power for the applications. A storage subsystem is a computer system that stores large amounts of data for one or more hosts, that are often on different platforms. Once common type of storage subsystem is a Redundant Array of Independent Disks (Raid). A RAID is a set of disks and a specialized disk controller for controlling access to the disk that increases performance and/or provides fault tolerance.

The two key storage innovations aimed at enabling wide-open data sharing are network-attached storage (NAS) and storage area networks (SANs). Both technologies liberate storage devices from their servers and make data generally available to a variety of users across multiple operating systems.

A storage area network (SAN) is a back-end network connecting storage devices via peripheral channels such as SCSI, SSA, ESCON and Fibre Channel. A centralized SAN ties multiple hosts into a single storage system, which may be implemented as a RAID device with large amounts of cache and redundant power supplies. This type of SAN allows storage systems to copy data for testing, perform routine backup and transfer between databases without burdening the hosts they serve.

SANs differ from traditional local area networks (LAN) and may suffer some disadvantages when compared to LANs. SANs are designed to optimize access to storage, while LANs are designed to optimize shared access to computing components to provide competing services, such as database services. SANs are not widely installed, while LANs are. LANs are also less expensive to build and maintain than SANs.

The key element of a NAS system is a storage device that manages the flow of data across a LAN or WAN. Directly attached to the network rather than an application server, the NAS device is itself a "thin" server that manages storage operations and an array of disks. Because NAS uses standard LAN/WAN connections and supports multiple communications protocols, it can support data from a wide range of UNIX and Windows NT servers. Data is accessed from NAS devices by file acess protocols (e.g., NFS and CIFS) from SAN devices by block access protocols, such as SCSI.

No matter what combination of web servers, application servers, storage subsystems and software an enterprise uses for a particular solution, the enterprise typically purchases the various components from various manufacturers. For example, the Web server may be purchased from Company A, the application server from Company B, the storage subsystem from Company C, and the software that provides the custom solution may be provided by Company D. Alternatively, some manufacturers may provide a service that analyzes and designs custom solutions, but purchases the various components from different companies.

A system comprising such a disparate combination of storage, servers, and networks can be extremely complex and require a high-level of cross-discipline expertise to install and operate. Such systems may take days or weeks to install and set-up. For example, the system may require a cluster of servers communicating with a cluster of storage devices located in another room, which not only adds to floor space requirements, but also requires a large amount of cabling and routing and redundant power resources. Due to the time involved, the installation may result in significant downtime for the enterprise.

Once the system is physically installed, the system may take separate IT teams, including a networking specialists, an operating systems specialist, and a database or storage administrator, to set-up, operate, and maintain.

In addition, each component of the system has its own level of reliability, availability, and serviceability, otherwise known as RAS. And when all the components are combined into one system, the overall RAS of the system is typically less than the RAS for the sum of the components due to interoperability concerns. That is, because the components of the system are made by different manufacturers, the components may not be all that compatible with one another and take a high degree of attention and expertise by the IT organization to maintain. I/O access problems, for instance, may have to be diagnosed between a processor service team and a storage service team. The result is significant installation and maintenance costs to the enterprise.

Accordingly, what is needed is and improved system for storing and serving data. The system should have increased RAS characteristics, be easy to install, and result in lower operating expense. The present invention addresses such needs.

SUMMARY OF THE INVENTION

The present invention provides a system and method for providing an integrated storage appliance. The storage appliance includes a storage subsystem, a processor cluster coupled to the storage subsystem, and a customizable software stack that includes storage-access application software executed by the processor cluster, wherein components of the subsystem, processor cluster and software stack are integrated such that the storage appliance exhibits greater combined reliability, higher availability, and higher serviceability characteristics than would be provided by a sum of the characteristics for the unintegrated components.

According to the system and method disclosed herein, the present invention provides an integrated storage appliance by embedding the processor cluster physically within the same housing as a storage subsystem and integrating the processor cluster with the storage-subsystem's power distribution system. Because the components of the storage appliance are compatible and tightly integrated, the storage appliance results in integrated, high RAS characteristics. By embedding processors into an existing storage subsystem, the service function may be integrated into one hardware unit, providing optimized monitoring facilities for both processor and storage.

BRIEF DESCRIPTION OF THE DRAWINGS

FIGS. 13-16 are screenshots showing the database service user interface in a preferred embodiment of the present invention.

DETAILED DESCRIPTION

The present invention relates to servers and storage devices. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

The present invention provides an integrated storage appliance comprising a combination of tightly-integrated, compatible components, preferably provided by one manufacturer, that results in the storage appliance exhibiting RAS characteristics higher than the sum RAS characteristics of each of the components.

Figure 1:
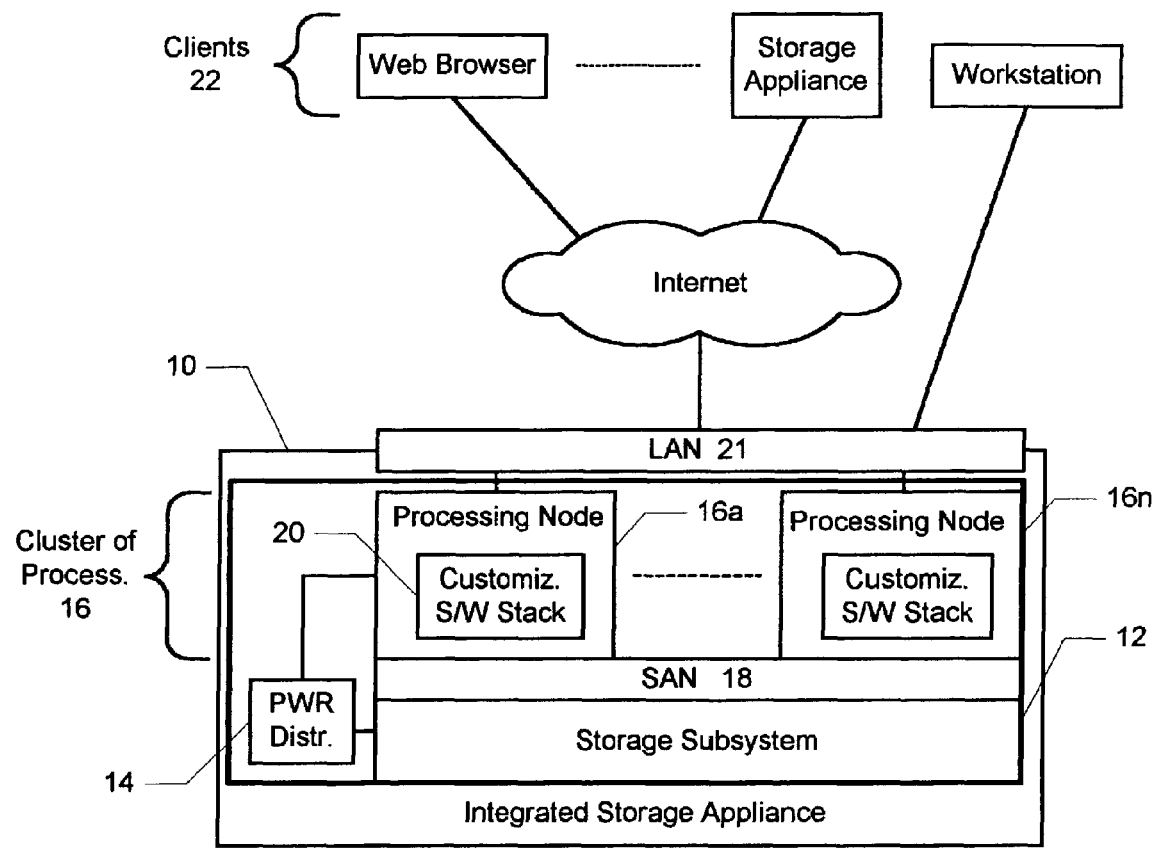
FIG. 1 is a block diagram of a storage appliance in accordance with a preferred embodiment of the present invention.

FIG. 1 is a block diagram of a storage appliance in accordance with a preferred embodiment of the present invention. The storage appliance 10 comprises a storage subsystem 12 that includes a power distribution system 14 and clusters of processor nodes 16 that are embedded in the storage subsystem 12. The storage subsystem 12 stores large amounts of data and provides block storage serving for the data.

The processor nodes 16 and the storage subsystem 12 are interconnected using an internal storage area network (SAN) 18. Each of the processor node 16 executes storage-access applications, referred to herein as customizable software stacks 20, and each of the processor node 16 are made available on a data communications network, such as local area network 21. Through the LAN 21, the processor nodes 16 serve as a front-end to the storage subsystem 12 to provide a variety of remote clients 22 with network access to the data. In a preferred embodiment, the network access may include any combination of LAN 21, Internet, and intranet. Storage intensive computer requests from the clients 22 are received directly by the processor nodes 16 using a web-based or non web-based interface that is supported by the local area network 21 and sent to the storage subsystem 12.

The customizable software stack 20 that is executed by the processor node 16 is designed to meet the needs of a particular solution. The customizable software stack 20 minimally includes an operating system, HTTP, data management software, and application software. According to the present invention, however, the customizable software stack 20 also includes diagnostic and monitoring software that enhances the reliability of the storage appliance 10. By executing the customizable software stack 20, the cluster of processors 16 performs both file serving and application serving for the clients 22.

Both the front-end processors and processor nodes 16 in the storage subsystem 12 (not shown) are clustered, and the processors in each cluster work independently. If a processor in a cluster fails, then another processor in the cluster takes over the functions in progress of the failed processor. By clustering both the front-end-processor node 16, and the storage processors, the reliability of the storage appliance 10 is significantly increased. In addition, should a failure ever occur, the diagnostic and monitoring software may automatically alert a service center.

The storage appliance 10 is referred to as an integrated appliance because the processor nodes 16 are physically located within the same housing as the storage subsystem 12 and is integrated with the storage-subsystem's power distribution system 14. Because the components of the storage appliance 10 are highly compatible because they are produced by the same manufacturer and tightly integrated, the storage appliance 10 exhibits very high RAS characteristics. By embedding processors into an existing storage subsystem 12, the service function for the appliance 10 may be integrated into one hardware unit, providing optimized Accordingly, once the storage appliance 10 is delivered to a customer, the storage appliance 10 may be powered on with one button and the customized software stack 20 will begin to execute with minimal problems and with minimal support staff required. Consequently, the integrated storage appliance 10 of the present invention provides customers with a turn-key solution that includes a pre-loaded software stack 20, minimal installation time, seamless network connections, automatic backup and recovery, and minimal complexity, resulting in significantly lower operating and maintenance costs.

Figure 2:
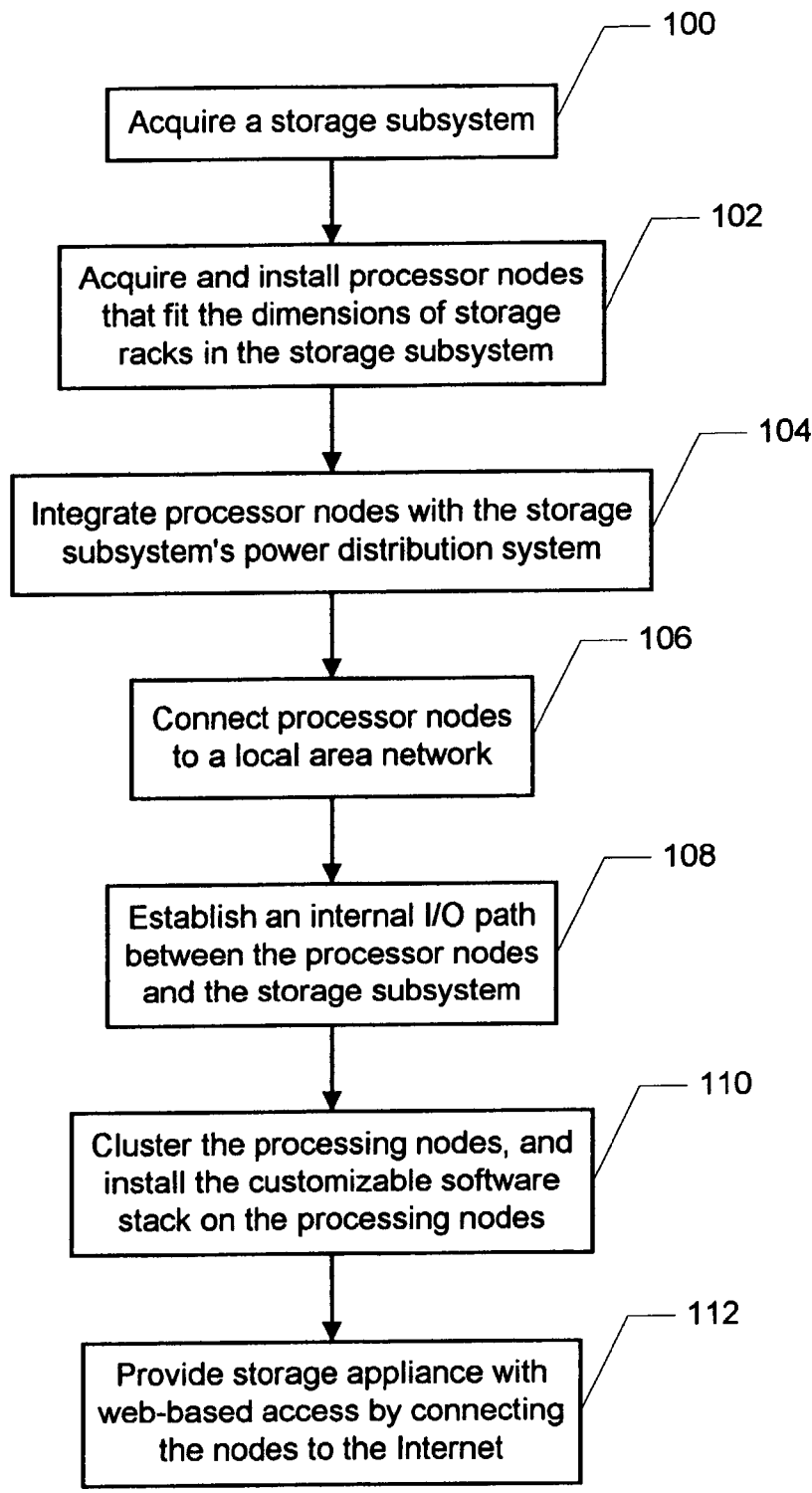
FIG. 2 is a flow chart illustrating a process for providing the storage appliance in further detail.

FIG. 2 is a flow chart illustrating a process for providing the storage appliance in a preferred embodiment of the present invention. The process begins by acquiring a storage subsystem 12 in step 100. An example of a storage subsystem 12 is an enterprise storage server.

Figure 3A:
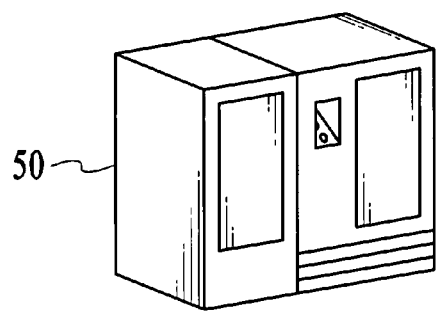
FIGS. 3A and 3B are block diagrams illustrating a storage subsystem implemented as an enterprise storage server in a preferred embodiment of the present invention.
Figure 3B:
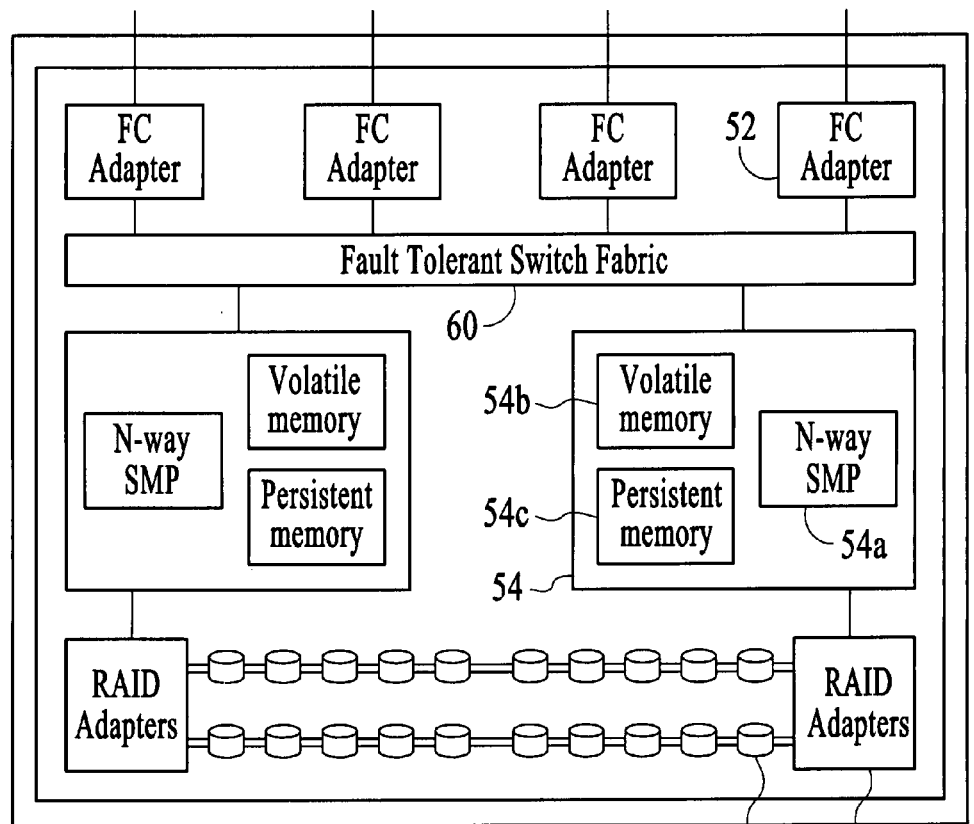

FIGS. 3A and 3B are block diagrams illustrating the storage subsystem implemented as an enterprise storage server in a preferred embodiment of the present invention. The enterprise storage server 50 is a self-contained unit comprising a cabinet or housing that contains the power distribution system 14 (FIG. 1) and the storage elements shown in FIG. 3B. Referring to FIG. 3B, major components of the enterprise storage server 50 include host adapters 52, cluster processor complexes 54, device adapters 56 and disk arrays 58. The host adapters 52 are external interfaces for the enterprise storage server 50 and support protocols such as SCSI and fiber channel. Each host adapter 52 connects to each of the cluster processor complexes 54 so that each cluster 54 may handle I/O's from any host adapter 52. The enterprise storage server 50 typically includes two processor complexes 54, each working independently. Each contains four RISC symmetric multi processors (SMP) 54a, a volatile memory (a cache) 54b, a persistent memory (a non volatile cache) 54c, and four device adapters 56. Within each cluster 54, the device adapters 56 are used to connect the disk arrays 58 to the cluster processor complexes 54. The disk arrays 58 may be configured as RAID 5 or non-raid arrays.

The enterprise storage server 50 is designed to support heterogeneous server platforms and has full redundancy of hardware components. On data writes, one copy of data is placed in one cluster 54 and the second copy of the right data is placed in the non volatile cache 54b of the other cluster 54. In event of either a planned or unplanned cluster outage, write data for the failed cluster is available on the other cluster, and the remaining cluster takes over the functions of the failed cluster.

The disk arrays 58 are mounted in the storage server 50 in drawers (not shown) and the drawers are slid into storage racks within the enterprise storage server 50. Depending on the configuration of the enterprise storage server 50, the enterprise storage server 50 will have empty storage racks.

Referring again to FIG. 2, after the storage subsystem 12 is acquired, processor nodes 16 that fit the dimensions of the storage racks in the storage subsystem 50 are acquired and installed in step 102.

In a preferred embodiment, the processor nodes 16 are 1 u, meaning that they are 1.75 inches high and fit within the racks in the storage subsystem 50. An processor node 16 contains at least one processor, memory, I/O support, storage and other devices, and operates stand-alone like other computers. An example of a 1 u processor device is the IBM Neffinity xSeries 330 web server, which includes an Intel microprocessor, SDRAM memory, internal storage, a SCSI interface, a CD drive, dual 10/100 Ethernet, and integrated cable chaining technology. The processor node 16 are attached to one another through dedicated high-speed connections, called SMP expansion ports, for sharing resources. This provides the capability to run several nodes as either a single large complex or two or more smaller units.

Referring again to FIG. 2, to effectively integrate the processor nodes 16 with the storage subsystem 12, the processor node 16 are integrated with the storage subsystem's power distribution system 14 in step 104. In effect, the power distribution system 14 is split into two, where one power supply powers the storage subsystem 12, and the other power supply powers the processor nodes 16 at a voltage appropriate for the processor nodes 16. In a preferred embodiment, the power supply 14 for the storage subsystem 12 produces 220V 3-phase power, while the power supply for the processor nodes 16 produces 110V 2-phase power. In a preferred embodiment, the multiple components are turned on in the correct sequence, such that at the end of the power in sequence, all the components are correctly initialized and ready to deliver service. Integrating the processor nodes 16 with the storage subsystem's power distribution system 14 allows the resulting storage appliance 10 to be turned-on and off with one button, and eliminates power cables.

After the processor nodes 16 are integrated with the storage subsystem 12, the processor nodes 16 are connected to a public network, such as a local area network (LAN) in step 106. In a preferred embodiment, the LAN comprises a Gigabit Ethernet network. An internal I/O path is also established between the processor nodes 16 and the storage subsystem 12 in step 108. Internally, each processor node 16 is connected to the storage area network (SAN), shown in FIG. 3B, which includes a switch 60, for allowing the processor nodes 16 to independently access the disk arrays 58.

Next, the processor node 16 are clustered, and the customizable software stack 20 is installed on the processor nodes 16 in step 110. In a preferred embodiment, six processor nodes 16 are installed into the storage subsystem 12, and the processor nodes 16 are paired to form three clusters. Each cluster may run an operating system different from the other nodes 16, or if desired, multiple clusters may be assigned to one operating system. Each cluster runs its own instance of the operating system and applications, and the multiple instances cooperate to perform the same task. In each cluster, one processor node 16 is a production node and the other is a standby node. If the production node fails, then the standby node takes over seamlessly. In a preferred embodiment, the standby nodes are provided with a power supply different from that of the production nodes to further increase reliability.

The customizable software stack 20 is installed by first establishing operating system clustering. Thereafter the database is added and the operating system clustering is used to provide a fault-tolerance for the database. Multiple copies of a customized web application is installed on top of the database. An HTTP server is placed on top of the web application in failure takeover mode. Finally, a tape backup system may be installed, so that the storage appliance 10 may automatically backup its own data. Software according to the present invention is built on a foundation of fault-tolerant storage, which underlies a fault tolerant database, which underlies a fault tolerant application.

Examples of customizeable software solutions that may be preloaded into the storage appliance 10 for delivery include a NetDB2 server, video streaming, Net.Commerce, email, SAP, Business intelligence, Protein/Genomic research, and content delivery. In a preferred embodiment, the customizable software stack 20 is loaded so that one processor cluster 16 performs the function of a presentation server, one cluster performs the function of HTTP server, and one cluster performs the functions of a monitoring and backup server.

Whereas data is accessed from NAS devices by file access protocols (like NFS and CIFS), from SAN devices by block access protocols (like SCSI), the storage appliance 10 permits code to be downloaded to it, so data access may occur through one or more data access protocols. For example, when appropriate software is loaded on the appliance, data by be accessed using the HTTP protocol over the web, by TCP/IP protocol, by ODBC or JDBC protocols, etc.

Figure 4:
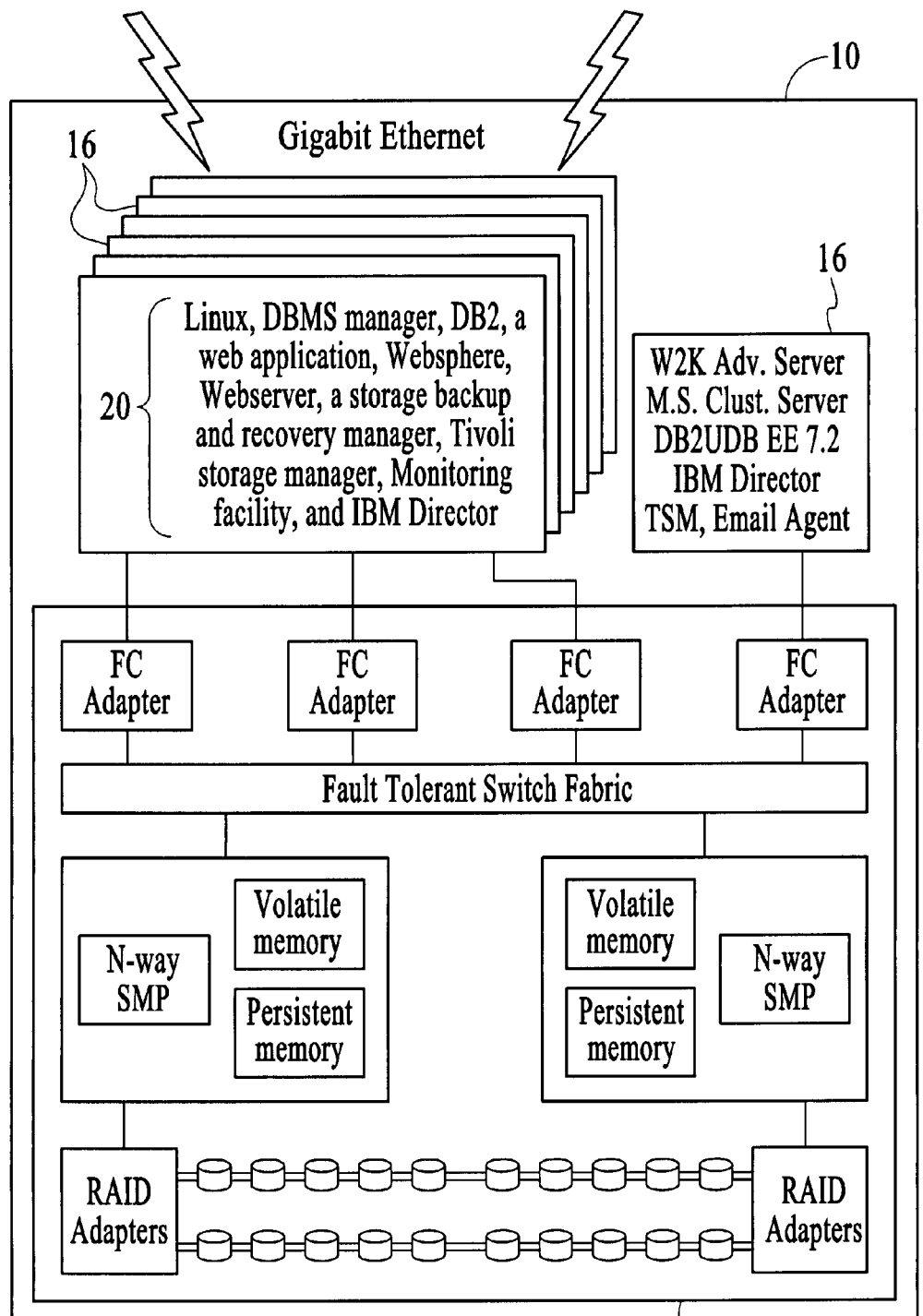
FIG. 4 is a block diagram illustrating an example customizable software stack executed by the enterprise nodes.

FIG. 4 is a block diagram illustrating an example customizable software stack 20 executed by the processor node 16. In a preferred embodiment, the customizable software stack 20 included on most of the clusters includes the Linux operating system, a DBMS manager, IBM DB2, a web application development and deployment platform, IBM WebSphere, Webserver (HTTP), storage backup and recovery manager, Tivoli Storage Manager (TSM), Monitoring facility, and IBM Director. On at least one cluster, the customizable software stack 20 includes the Windows 2000 operating system, MS Cluster Service (MSCS), DB2, IBM Director, TSM, and an email Agent.

DB2 is a well-known relational database product. IBM WebSphere is server software that runs on top of an HTTP server to provide an environment for running dynamic web applications linked to data in DB2. WebSphere also provides a set of PC-based tools to help developers create WebSphere applications.

The IBM Director is a workgroup hardware manager that provides management application logic and persistent data storage management information. The IBM Director provides point-to-point remote management of client systems from a web browser window. Basically, the IBM Director is designed to reduce system downtime and has the capability of issuing alerts in the event of a problem is detected, further enhancing the reliability, availability, and serviceability of the storage appliance.

Referring again to FIG. 2, once the customizable software stack 20 is installed on the processor node 16, the storage appliance 10 is provided with web-based access by connecting the nodes 16 to the Internet in step 112. In a preferred embodiment, the Internet connection is performed through the local area network 21. Accordingly, the Internet connection allows client devices 22 to send I/O requests using a web-based interface that is supported by the local area network 21.

Referring again to FIG. 1, it should also be noted that clients 22 may also interface the storage subsystem 12 directly through the existing fiber channel adapters, as was the case before the processors 16 were integrated into the storage appliance 10. In addition, multiple Internet-ready storage appliances 10 may be connected via the Internet or the local area network 21 to provide a network of integrated storage appliances 10.

Two examples of web-based storage applications that may be run on the storage appliance 10 are provided below.

Network Storage System

The first application is to configure the storage appliance 10 as a network of enterprise storage servers 50 to provide an effective and efficient storage service that address the following needs. First, the demand for storage capacity has been increasing at an exponential rate owing to the widespread use of the Internet and database technologies to support business operations. More than 50% percent of all capital investments in corporate data centers goes towards data storage and the percentage may hit 75% by 2003. For the amount invested in storage, personnel costs for storage management and maintenance weigh well over equipment costs. In addition to corporate needs, personal needs for storage are also on rapid rise due to the increase in both size and number of files. Therefore, it is not surprising that a new market has emerged for storage outsourcing through the Internet.

Such network storage has several emerging issues:

Availability: As network storage systems provide data sources for critical business and personal applications, it should be highly available and fault-tolerant.

Security: Security is an increasingly critical issue for network storage systems as online commerce becomes more and more important.

Scalability: Popularity of the network storage system entails significant increase in the amount of data stored, the number of concurrent users, and the size and number of files transferred between the systems and their clients. Performance (i.e. system bandwidth) of these systems needs to scale accordingly.

Used as an enterprise storage server 50, the storage appliance 10 addresses these issues by providing an Internet-based network storage system built on the enterprise storage server 50.

Figure 5:
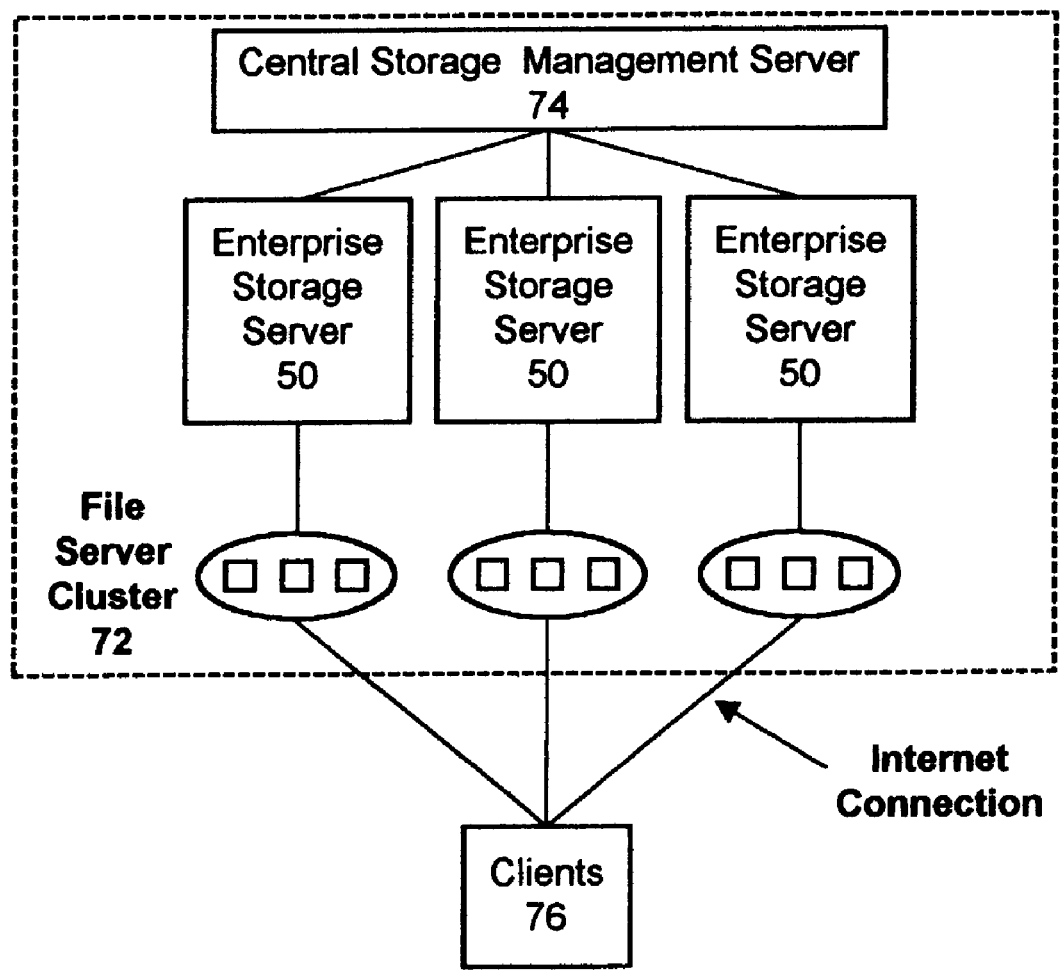
FIG. 5 is a block diagram illustrating the basic architecture of the network storage system.

FIG. 5 is a block diagram illustrating the basic architecture of the network storage system. The network storage system 70 includes three major components; file server clusters 72, enterprise storage server 50, and a central storage management server 74. The core parts of network storage system 70, the enterprise storage servers 50 and the central storage management server 74, are placed in an Intranet to protect them from malicious attacks. File server clusters 72 are placed between the core parts of network storage system 70 and Internet clients 76.

The network storage system 70 is designed using a geographically distributed architecture, with enterprise storage server 50 and file server clusters 72 placed in several geographically separated locations. File server clusters 72 serve as the middle layer between clients 76 and the enterprise storage servers 50. The file server clusters 72 take storage requests from clients 76, transfer the requests to file server clusters 72 take storage requests from clients 76, transfer the requests to enterprise storage server 50, and receive and send enterprise storage server 50 responses back to the clients 76. The requests are balanced among servers 72 in the cluster to improve performance and scalability. The use of file server clusters 72 also ensures fault-tolerant operation. If one of the file servers failed during the operation, its load would be distributed among the rest of the servers automatically.

The enterprise storage servers 50 are used to store data from clients, and the design of the enterprise storage servers 50 features high availability, performance, manageability, and scalability. The central storage management server 74 is used to manage storage spaces in the distributed enterprise storage servers 50 and to cache data among them. As online business reaches out globally and personal users might travel widely, data caching onto the distributed enterprise storage servers 50, as a key to flexibility, availability and performance improvement, will take an increasingly important role.

The choice of each of the three components is important in ensuring availability, security and scalability. Such an architecture has two advantages. First, it allows data to be replicated and cached in different locations to protect against regional disasters. Second, it allows storage requests from clients 76 to be routed to the nearest enterprise storage server 50 to minimize network traffic. As the online commerce is increasingly global, such routing can enhance system performance significantly.

Figure 6:
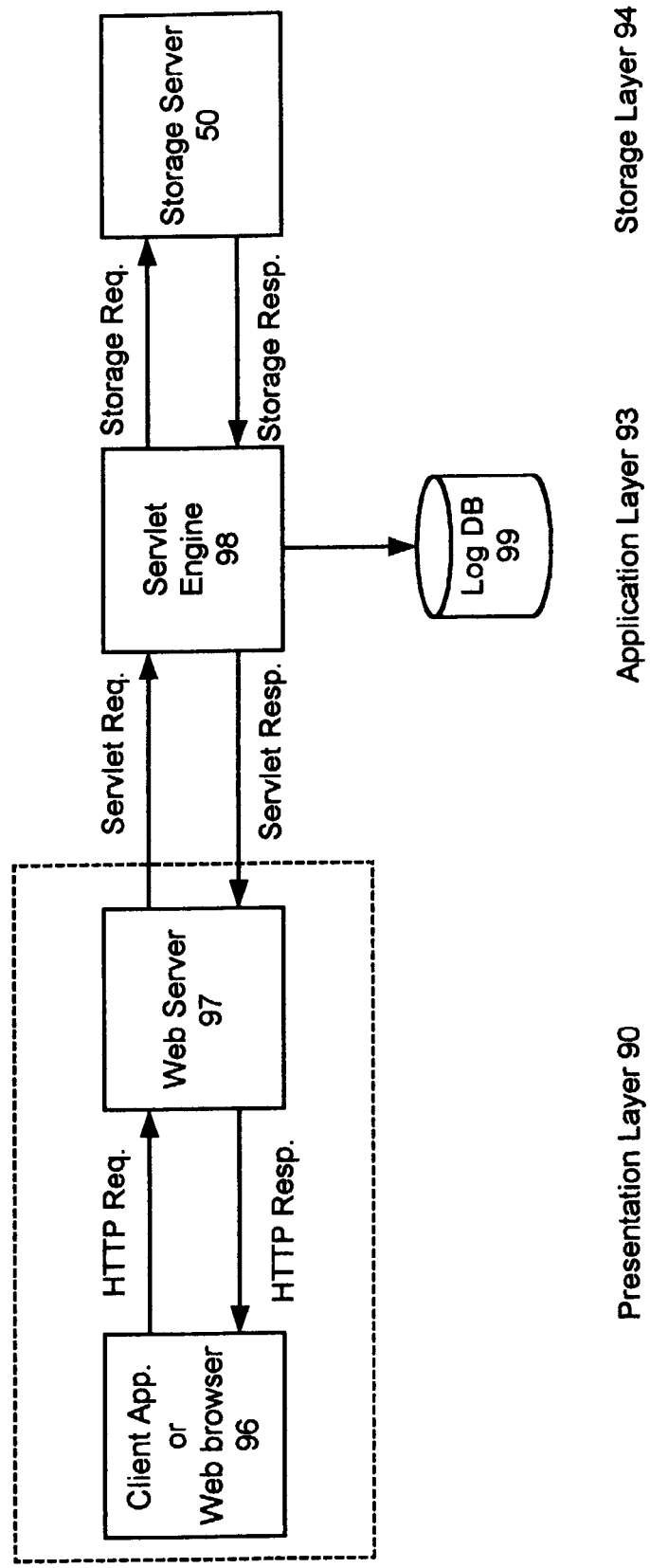
FIG. 6 is a diagram showing a three-tier software architecture for the network storage system.

FIG. 6 is a diagram showing a three-tier software architecture for the network storage system. The software tiers include a presentation layer 90, an application layer 93, and a storage layer 94. The encapsulation of software components of one layer from another can help achieve better interoperability and higher scalability.

According to one aspect of the present invention, the network storage system 70 is designed to be transparent to the clients 76. Software applications and web browsers 96 running on the clients 76 can access the data stored on the enterprise storage servers 50 as if the data was stored locally. Therefore, the client applications 96 are the presentation tool in the system 70. In a preferred embodiment, a web server 97 (e.g., Apache) handles HTTP requests from clients 76 and delivers HTTP responses to clients 76 from the storage server 50. To ensure the security of network storage system 70, the only communication channel between clients 76 and network storage system 70 is restricted to the HTTP port.

One problem with using HTTP protocol is that it assigns meanings to certain character sequences, (e.g., end of transmission). Therefore, when uploading a file from the client 76 to the enterprise storage server 50, it is possible that the HTTP protocol will read such a character sequence and prematurely terminate the transmission.

According to the present invention, when a file is being uploaded from the client application 96 to the enterprise storage server 50, the file is encoded prior to transmission and decoded by the enterprise storage server 50 to eliminate interference by the HTTP protocol.

In a preferred embodiment, the application layer 93 includes Java servlets (not shown) managed by a servlet engine 98 (e.g., IBM's WebSphere), and a Log database 104. The application layer 93 is responsible for dynamic HTML generation, user authentication and session management. All transactions between clients 96 and the storage server 50 are recorded in the log database 99 besides a web log. Some critical information missing in web log, such as session identification and transaction time, are stored in the log database 99. Combined with web log, the log database 99 provides an ideal data source for data mining based storage caching.

The storage layer 94 is located in the storage server 50 and communicates with the application layer 93 through SCSI protocol. A client's HTTP request (i.e. file downloading) triggers its corresponding servlet request (i.e., file downloading servelt), which in turn, issues a storage request to the storage layer 94. The storage layer 94 reads the corresponding file and sends it back to the application layer 93, which transforms it into servlet output stream and sends the steam to the client 96.

In a preferred embodiment, the Log database 99 includes five tables, corresponding to GENLOGIN, STORAGE, FILESYSTEM, DOWNLOADINFO and UPLOADINFO. The GENLOGIN table provides user login information for the network storage system 70. The STORAGE table describes user storage information in the Network storage system 70. The FILESYSTEM table contains description information of all the user files stored in the network storage system 70. Its table structure is listed below. Every user's download/upload activity is recorded in tables DOWNLOADINFO and UPLOADINFO.

FIGS. 7-12 are screenshots of file management functions of the storage server 50 that a user may access through a client application 96, such as a web browser. The network storage system 70 provides major file transfer, management and security functionalities. As shown, the user interface include links that allows a user of the client 96 to upload/download files, compress the files, encrypt/decrypt files, delete files, view information, and change passwords.

Figure 7:
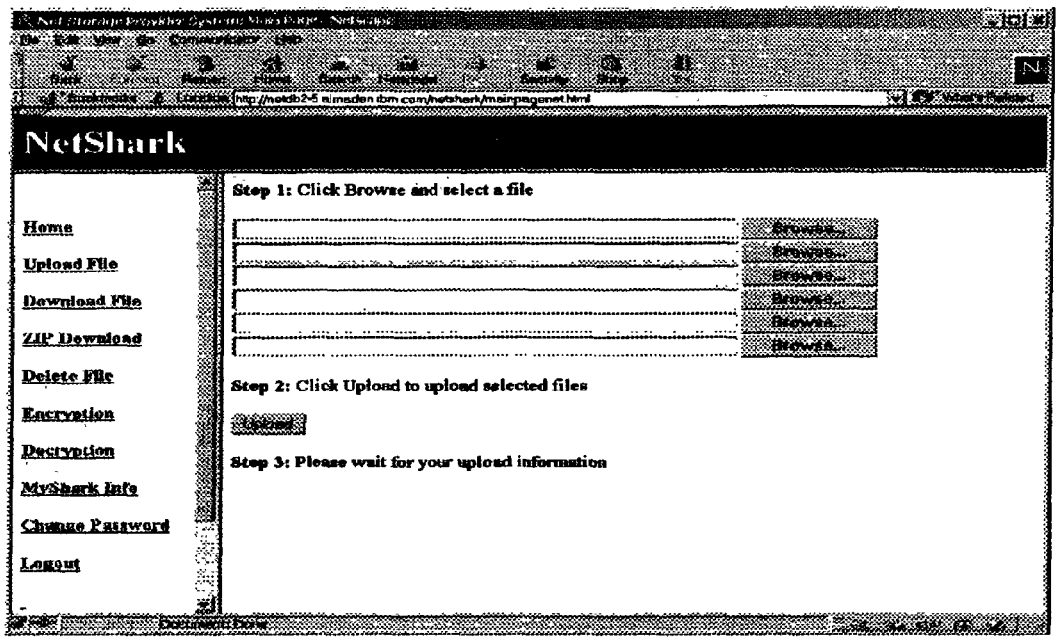
FIGS. 7-12 are screenshots of file management functions of the storage server that a user may access through a client application, such as a web browser.

FIG. 7 is a screenshot of the file upload function. The file upload function reads files from the client application 96 and transforms them into an ServletInputStream, which is an encoded version of the file. The ServeletInputStream is transferred through the Internet to a file server 72 attached to storage server 50. The file server accepts, decodes the ServerletInputStream, and stores its file contents in the storage server 50.

Figure 8:
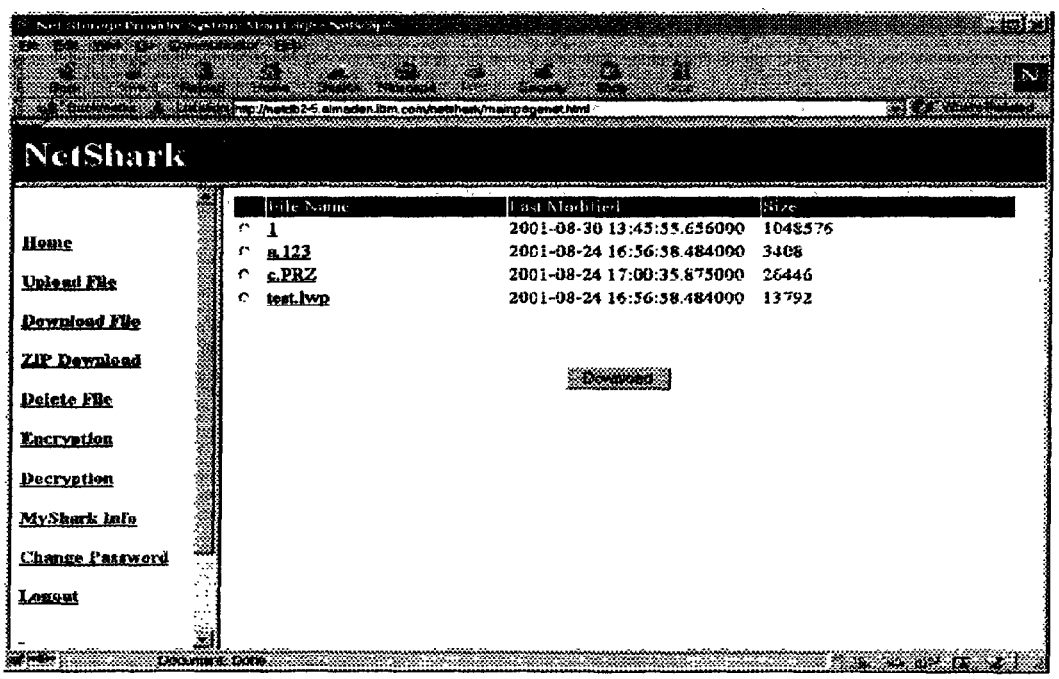

FIG. 8 is screenshots of the file download function. Once the user selects a file or files and clicks "download", the file download function reads the selected file(s) from storage server 50 and transforms them into an encoded ServletOutputStream. The ServeletOutputStream is transferred through the Internet to the client application 96; and the client application 96 accepts, decodes the ServerletOutputStream, and stores its file contents.

Figure 9:
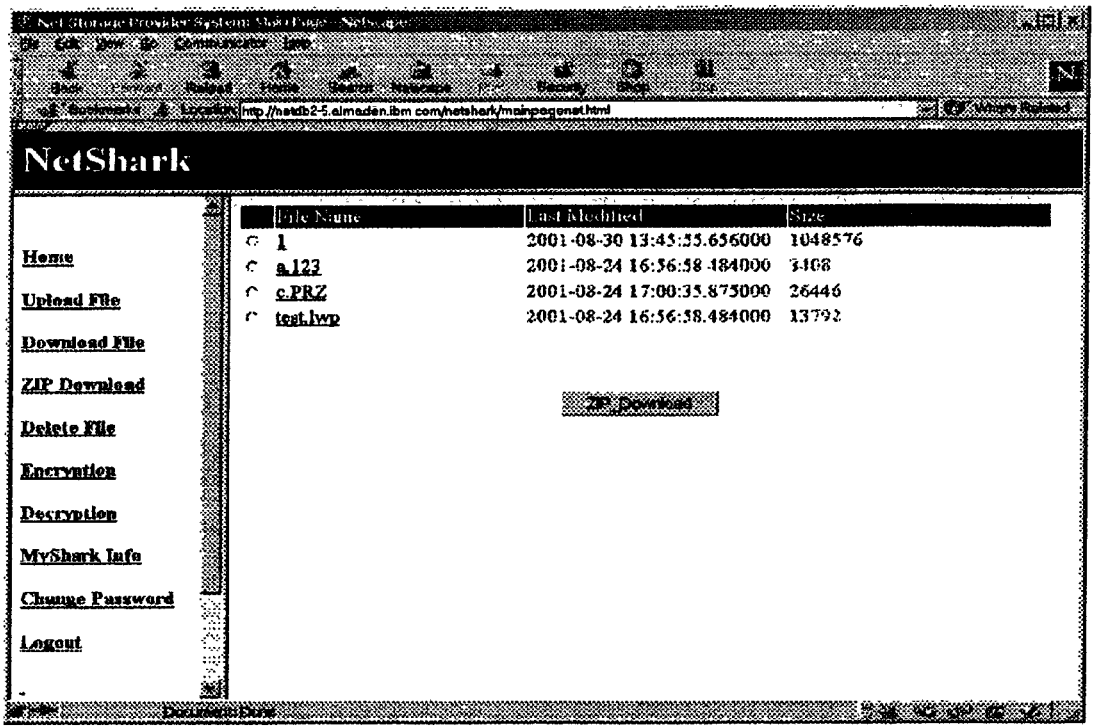
Figure 10:
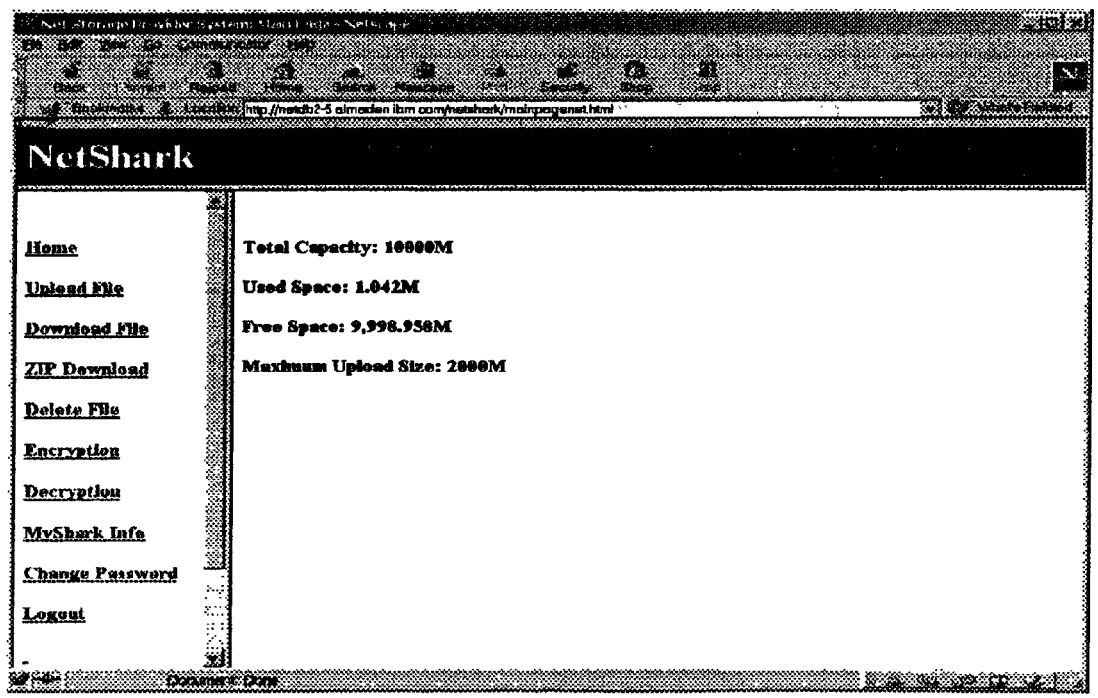

FIG. 9 is a screenshot of the compressed file download function. In a preferred embodiment, the files are compressed using Zip format. Once the user selects a file or files and clicks "Zip download", the file download function compresses the file(s) and transmits the file. The compressed download function reads files from storage server 50 and transforms them into an encoded ZIPOutputStream. The ZIPOutputStream is transferred through the Internet to the client application 96. The client application 96 accepts, decodes the ZIPOutputStream and stores its file contents. As network bandwidth is the bottleneck in the network storage system 70, it is expected that time saved on transmitting compressed data will outweigh the overhead of compressing and decompressing data.

Figure 11:
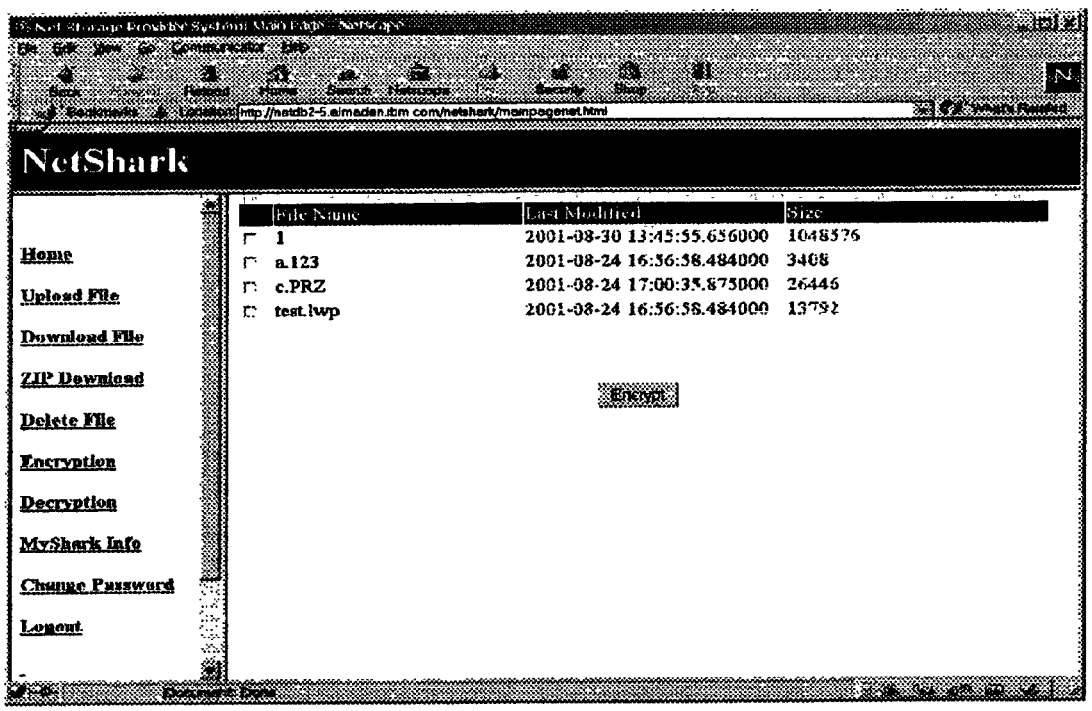
Figure 12:
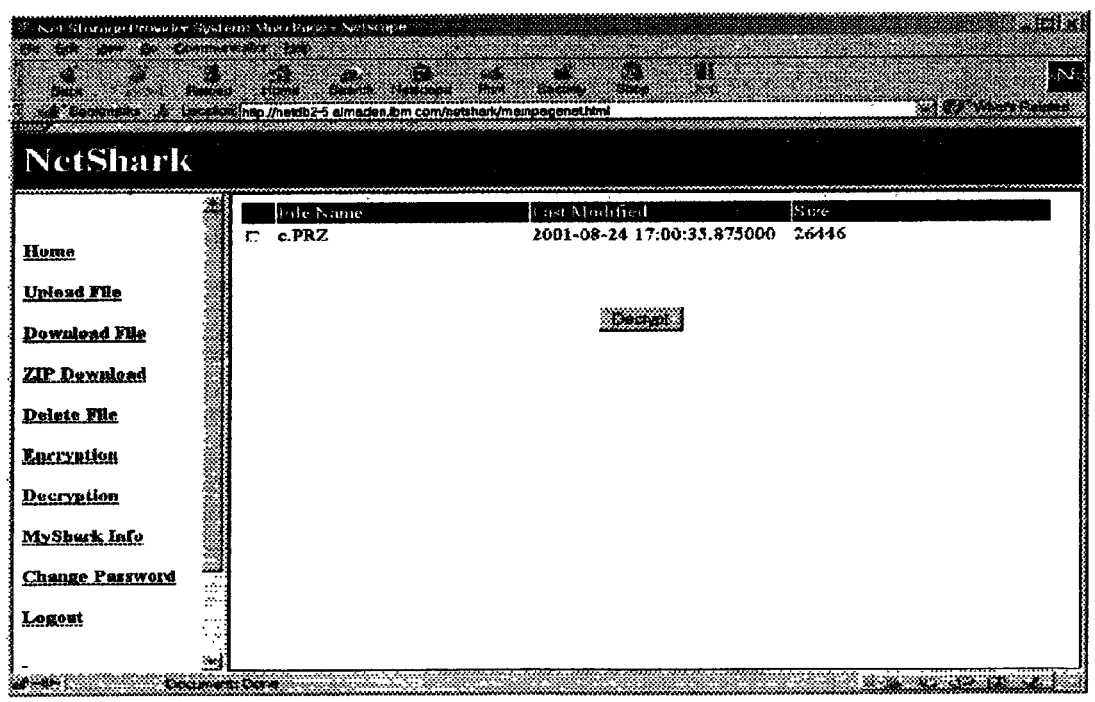
Figure 14:
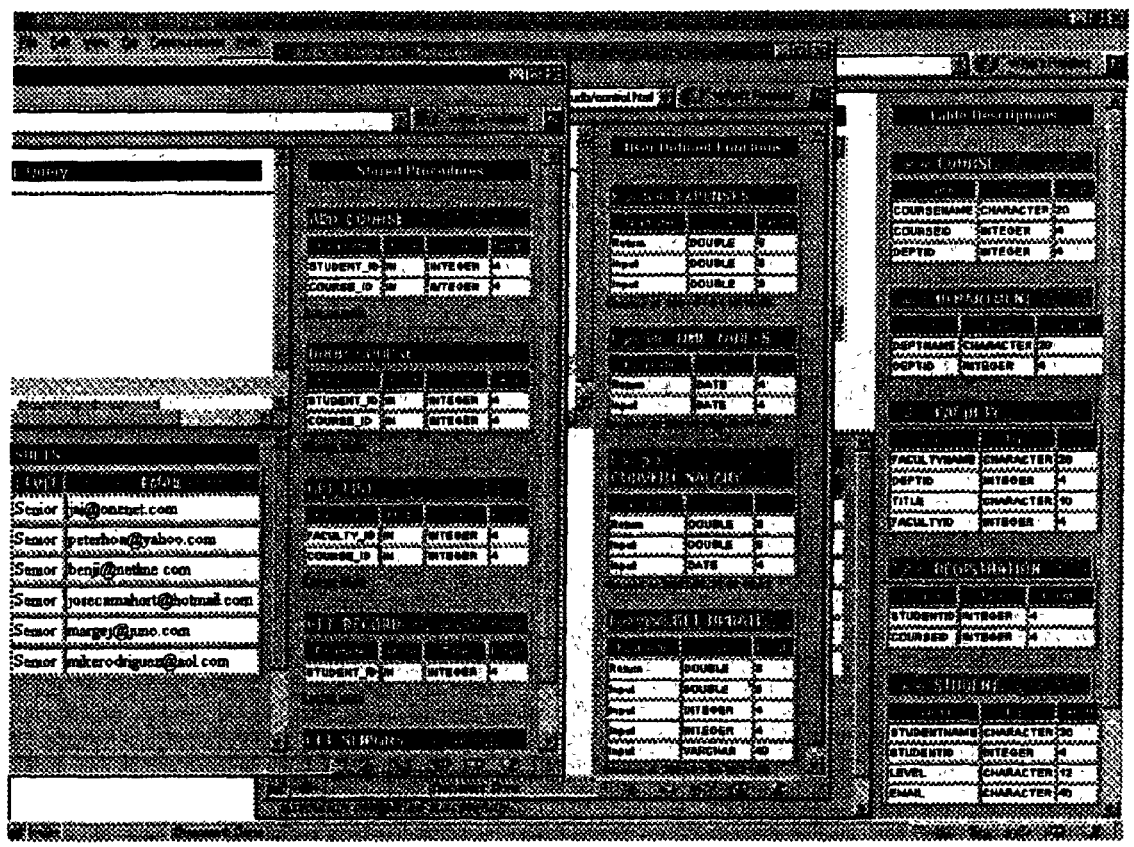

FIGS. 11 and 12 are screenshots of the encryption and decryption of files, respectively. Sensitive user files need to be encrypted to protect user privacy. Network storage system 70 assigns a key for each user to encrypt files. In a preferred embodiment, the encryption function reads the user's key and transforms it into an integer using formula coded in a Java class. It then reads every byte from a regular file, adds the integer to the byte and outputs the byte to its corresponding encrypted file. The decryption function reverses the process. Users' keys are maintained by the network storage system administrator, and the transforming formula can be easily changed by a network storage system programmer.

Two techniques have been employed to improve network storage system 70 performance—compression and storage caching. As described above, compression is used to transfer data between the storage servers 50 and clients 76 over the network, and then de-compress the data at the destination.

Referring again to FIG. 5, caching data to the nearest storage server 50 to clients 76 can further minimize network traffic and save network bandwidth, which in turn, will improve the performance of network storage system 70. For example, when comparing download performance between Tucson and San Jose from a storage server 50 located in San Jose, downloading data from a closer storage server 50 improve performance by an average factor of 5.7. The result convinces that caching data to the nearest could improve network storage system 70 performance significantly.

A variety of research projects have explored techniques for scaling the number of servers to enhance the performance of network storage systems. However, adding servers to improve system performance is an expensive solution. The present invention enhances performance using existing storage servers using geographically-based caching. In geographically-based caching, a user's storage request is routed to the user's nearest storage server 50 to minimize network traffic which, in turn, should increase the system performance significantly. As users of network storage systems become more globally distributed, it is ineffective and unreliable to keep a central located system.

Similar to web caching, which is the temporary storage of web objects for later retrieval, storage caching focuses on how to distribute copies of storage objects (i.e. files) over storage servers. Proper storage caching can reduce network traffic, save network bandwidth and increase storage objects availability. Major issues in storage caching include what storage objects need to be cached, when to cache them, where to cache them and how to keep consistency between the original storage objects and the cached ones.

The storage caching solution provided by the present invention includes three parts—storage caching, cache replacement and cache consistency. In a preferred embodiment, a data mining-based storage caching algorithm, which not only caches storage objects on demand, but also cache related storage objects for later retrieval. The algorithm includes two parts—offline learning and online caching. The input of the offline part is web log and the log database 99. Association rule mining can be applied to the input data to find correlations among storage objects. Association rule mining is defined on a set of items $L=\{i_1, i_2, \ldots, i_k\}$. Let D be a set of transactions, where each transaction T is a set of items such that $T \subseteq L$. The support of an itemset (i.e. set of items) in D is the fraction of all transactions containing the itemset. An itemset is called large if its support is greater or equal to a user-specified support threshold. In the case of storage caching, sessions can be treated as transactions and storage objects can be treated as items. Therefore, association rule mining applied on web log and the log database 99 can extract all large storage object sets from sessions.

The input of online caching is large storage object sets, the storage object on demand and the size of free cache space which equals to the free cache space coefficient times the size of storage object on demand. The coefficient can be learned from simulation to maximize cache efficiency. The online caching algorithm first caches the storage object on demand. Then, all large storage object sets that contain the storage object on demand are enabled. In the while loop, the algorithm below tries to cache as many most correlated storage objects as possible given the fixed free cache space:

```
Input: LSS (i.e., large storage object sets),
    sod (i.e., storage object on demand),
    fs (i.e., size of free cache space)
cache sod;
```

-continued

```
fs = fs - size(sod);
disable all elements in LSS;
enable all LSS elements that contain sod;
while (fs >0)
{
select the enabled LSS element lss with the largest support;
    for every storage object so ∈ lss
    {
        if (fs=<0)
        break;
        if so already cached
        continue;
        else {
            cache so;
            fs = fs - size(so);
        }
    }
    disable lss;
}
```

Some previously cached storage objects need to be removed from storage servers 50 to save space for newly cached storage objects. A known Least-Frequency-Used cache replacement algorithm is used in the network storage system 70 that replaces least frequently referenced storage objects. However, some newly cached storage objects could have very low reference frequency and it is undesirable to replace them. Therefore, only the storage objects that have stayed in storage servers 50 longer than a time period are considered for replacement.

```
Input: living time (i.e., only the objects that have stayed in storage servers longer than
    living time are considered for replacement),
        rfs (i.e., required size of free space),
        rl (i.e., required location of free space)
SELECT object name
INTO T
FROM Object Location
WHERE (current time – caching time) > living time
AND object location = rl
ORDER BY reference frequency
while (rfs > 0)
{
if (T = φ)     break;
read the first record t from T;
    remove storage object so from rl where (so.name = (t.object name));
    delete from Object Location where ((object name = (t.object name)) and
(object location = rl));
    delete t from T;
    rfs = rfs - size(so);
}
It is critical to keep consistency between original objects and cached objects.
```

A Push & Pull algorithm may be used to keep consistency between cached storage objects and their original ones. Before describing the algorithm, two data structures stored in the central storage server 50 are introduced; an object location and object change. Data structure object location includes four attributes: object name, object location (i.e. which storage server stores the object), caching time (i.e. when was the object cached) and reference frequency (i.e. how many times the cached objects has been referenced). Data structure object change contains three attributes: object name, object location, and change time (i.e. when did the object change). The push part of the algorithm is invoked periodically (i.e. hourly). Storage objects that have been changed longer than a time span (i.e. 60 minutes) are checked out to update all of their copies distributed over enterprise storage server 50. The pull part of the algorithm is triggered whenever the changed object is referenced. Combing push and pull together, the algorithm, ensures the cache consistency efficiently. The Push algorithm is listed below:

The new paradigm opens up a new area of research. To the best of our knowledge there is no previous work in the area of database as a service. One issue that needs to be addressed is they type of interface provided for the database service. The interface must be easy to use and should fit into existing paradigms.

```
The Push Algorithm is as follows:
    Input: time span (i.e., the span of time that inconsistency among storage objects
can be tolerated)
        select object name, OC.object location, OL.object location
        into T
        from Object Change OC, Object Location OL
        where (current time − change time) > time span
        and (OC.object name) = (OL.object name)
        and (OC.object location) <> (OL.object location);
        for every record t ∈ T
        {
            read storage object so from (t.OC.object location) where (so.name =
(t.object name));
            copy so to (t.OL.object location);
            delete from Object Change where (object name = (t.object name));
        }
The Pull Algorithm is as follows:
    Input: object name
        select OC.object location, OL.object location
        into T
        from object change OC, object location OL
        where (OC.object name) = (object name)
        and (OC.object location) <> (OLobject location);
        if (T = φ)     return;
        for every record t ∈ T
        {
            read storage object so from (t.OC.object location) where (soname =
(t.object name));
            copy so to (t.OL.object location);
        }
        delete from Object Change where (object name = (t. object name));
```

The Internet-based network storage system 70 of the present invention addresses the three emerging issues for network storage systems—availability, security, and scalability.

Database Service User Interface

The second example of an application for the enterprise storage server 50 is an Internet-based database service. Software professionals are spending a lot of their time on e-business applications. When one examines a large number of such applications, three software components appear very often. The web server is the most common component. Many have a web application server as the second, and the database server as the third. Applications are split into components, some of whom have states and others that are stateless. State is usually maintained in some form of transactional system. Commercial relational database products are the most commonly used transactional systems in e-business applications. The database could be considered the most vital component of a successful e-business solution. Hence, a database service offering makes perfect sense.

People are still needed to trouble-shoot and administer software subsystems like databases. There is need for database backup, database restore, and database reorganization to reclaim space or to restore preferable arrangement of data. Migration from one database version to the next, without impacting solution availability, is an art still in its infancy. Parts of a database solution, if not the entire solution usually become unavailable during version change. Coincidentally database users often view these as the most onerous of their tasks. The database service performs these tasks.

Prior to describing the database service user interface, a brief description of the database service architecture is provided with reference to FIG. 5. In a preferred embodiment, the database service is implemented using the three-tier architecture shown, namely; the presentation layer 90, the application layer 93, and instead of the storage layer 94, a data management layer (not shwon). As described above, the presentation layer 90 includes a user's web browser 96 and a web server 97. The user's browser 96 is responsible for displaying the user interface and the web server 97 manages the communication between the browser and the database application. The application executes the server side logic generating the user interface. The application layer 93 includes of Java servlets managed by the servlet engine 98. Java was selected out of the desire for platform portability. In response to user interaction, HTML pages are generated and handed over to the presentation layer 92. This layer is also responsible for user authentication, session management by using session ids, and database connection management. The data management layer is part of the storage server 50, which includes a database manager and a backup/recovery server (not shown). The servlet engine 98 communicates with the database using the JDBC protocol. The database server and the backup/recovery server communicate, on a set schedule, through a private and secure high-speed network, without human involvement.

The principle cost of operating a database service is human cost. A successful database service needs to continuously reduce the human cost. Time devoted to answering user phone calls and e-mail is a significant component, unless the user interface is intuitive and simple. Software product development organizations often invest in social scientists to help design user interfaces. The user interface of the present invention is based on two simple principles; consistency and simplicity. Subject to these two principles, the user interface design and functionality were driven by users. Implementation cost was also used in making trade-offs. Finally, thought was given to preserving the same "look and feel" on the various screens.

Figure 13:
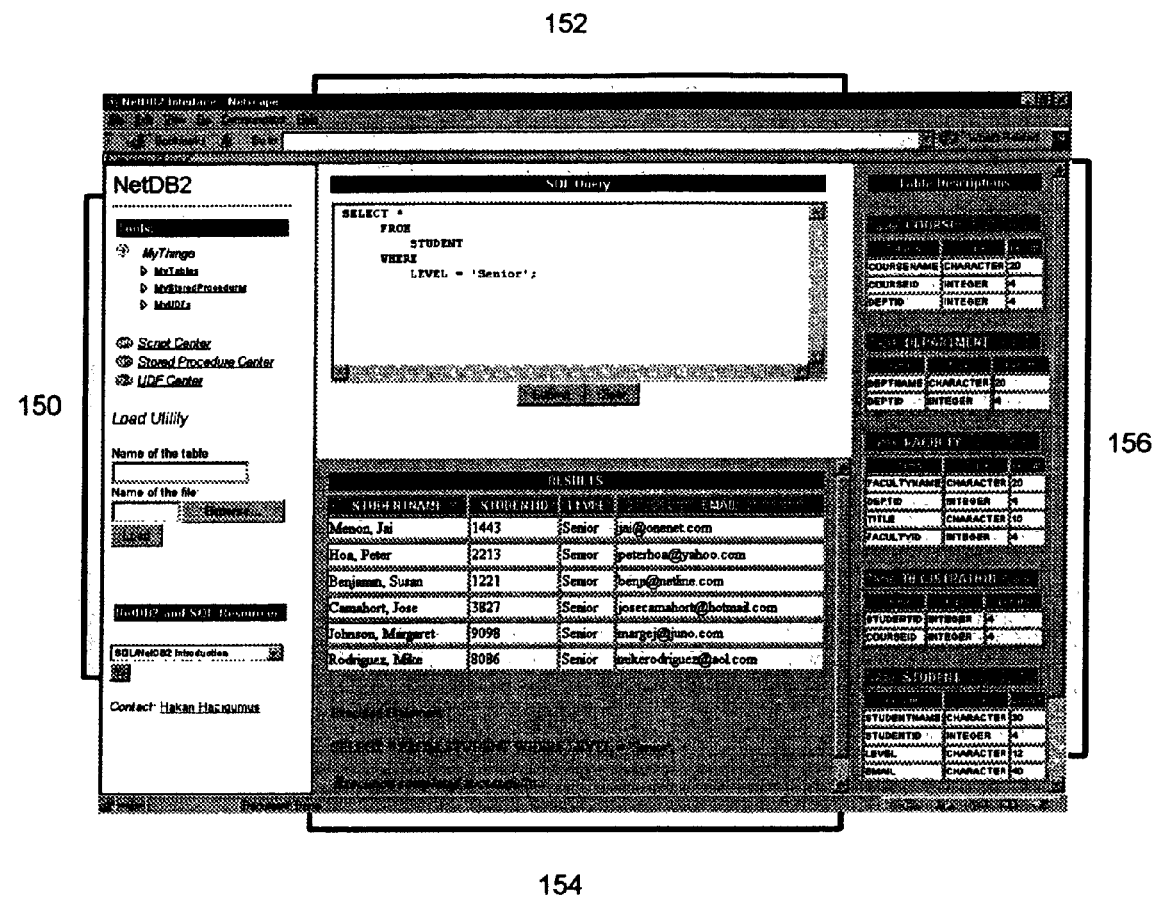

FIGS. 13-16 are screenshots showing the database service user interface in a preferred embodiment of the present invention. The user interface is is divided into four parts 150, 152, 154, and 156. The middle regions 152 and 154 of the screen are used to type in queries and obtain their results. The upper half 152 is reserved for entering a SQL query, and the lower half 154 for receiving results. The left region 150 of the screen lists tools and available documentation, and the right region 156 lists metadata information of the database to allow users to refer to metadata, tools and documentation during the use of the database service. Whenever metadata is queried from here, the metadata queried is displayed on the right region 156 of the screen. FIG. 13 is a screenshot obtained after (1) querying metadata for table names and (b) after submitting a select query.

The different metadata that can be queried by a single selection are listed under the title "My Things" in FIG. 13. They include a list of tables, stored procedures, and user defined functions. Examples of the different metadata obtained on querying is shown in the screenshot in FIG. 14.

Returning to FIG. 14, notice reference to three centers below My Things. Each center may be considered as a separate database application development facility.

The Script Center allows users to send more than one SQL query to the DBMS in one click. SQL queries need to be separated by the delimiter character. Users found the script center useful when some activity repeatedly performed against a database needed more than one SQL statement. One example is the creation and population of a table. Users were also found to be sharing the scripts.

Figure 15:
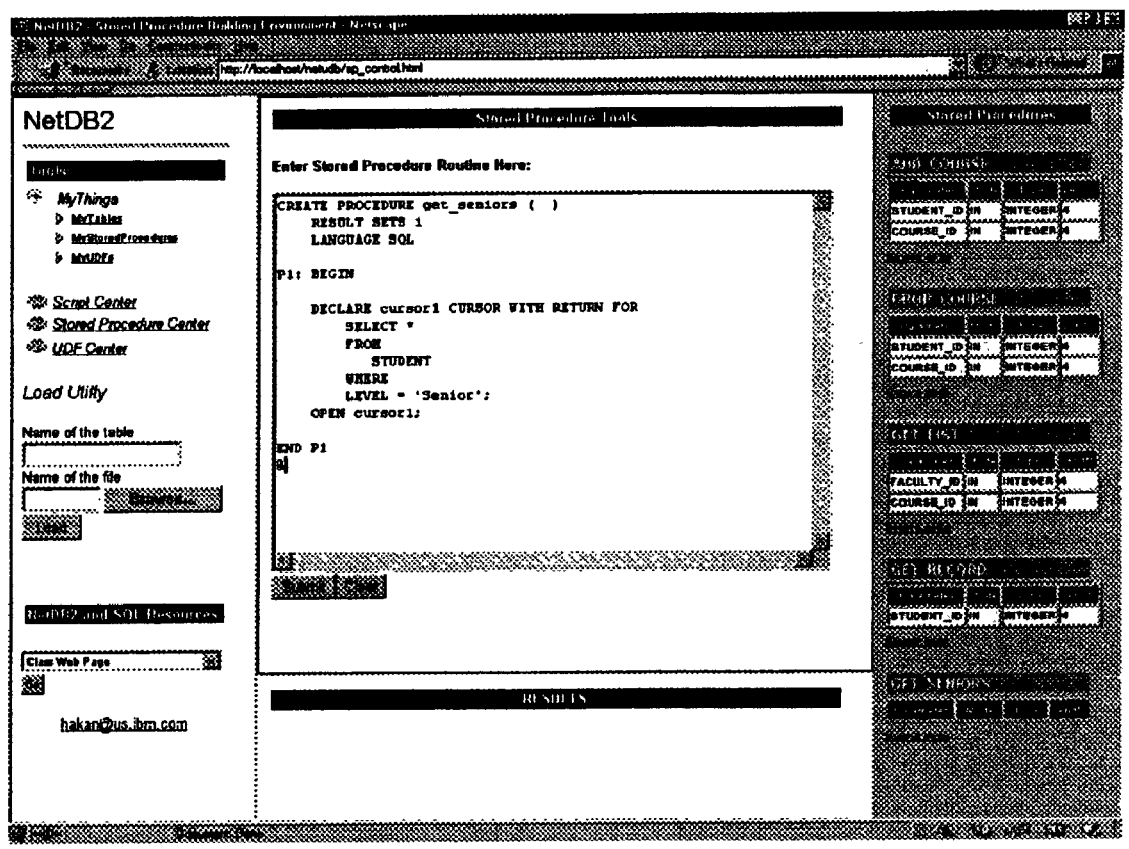

The Stored Procedure Center is used to create stored procedures. FIG. 15 is a screenshot of a Stored Procedure Center Screen. Stored procedures are a set of SQL statements used together with control logic. Applications use stored procedures to implement logic outside or around SQL statements. They can reduce network communication and have been used to improve performance in client/server applications.

Figure 16:
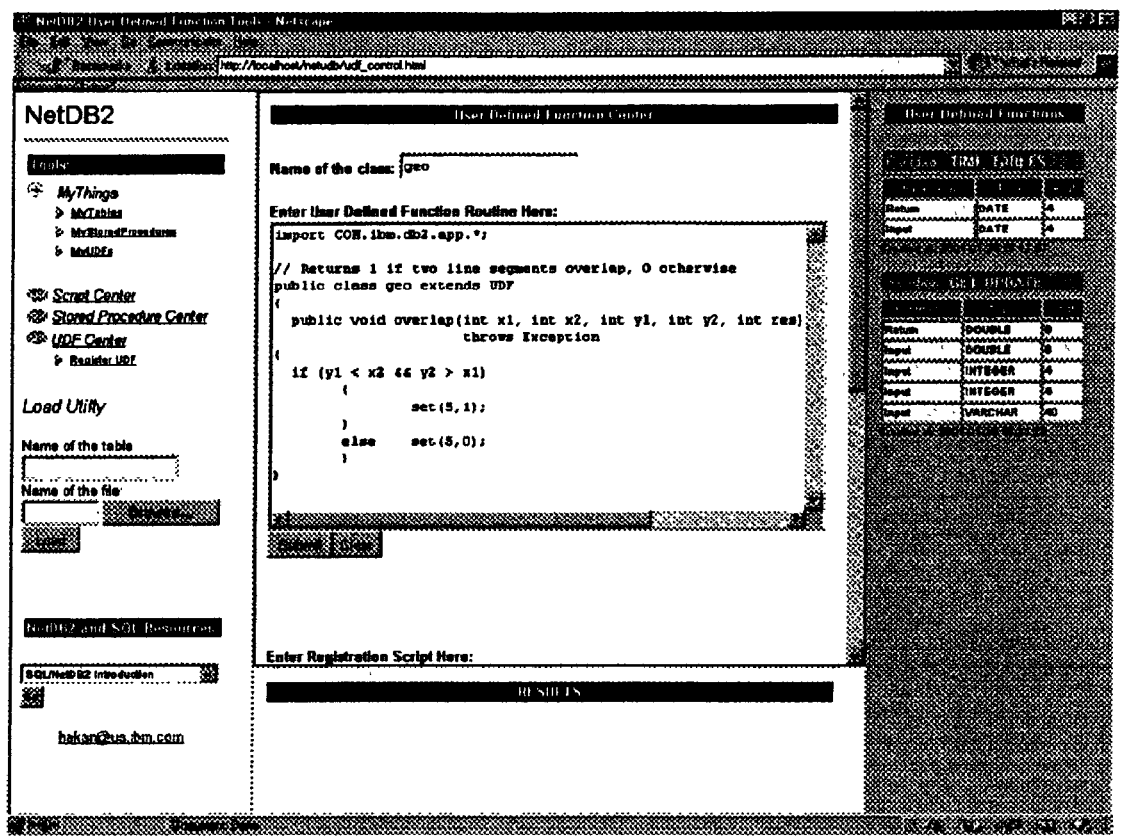

The User Defined Function Center is used to extend the built-in functions supplied with the database manager. For example, time may appear in the column of a table according to the Gregorian calendar. A user may need time to be expressed according to a specific lunar calendar. The user can write or input user defined function (UDF) (also known as foreign function) code for making the date conversion and checking it into the database manager. FIG. 16 is a screenshot of a UDF Center Screen. Also included is a bulk data Load utility. Since data resides at the database service provider side, this is an often-used utility. It is used to upload data from the users computer through the network and insert into the user table specified.

An integrated storage appliance and specific applications have been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A network storage system comprising:
a client connected to a network and running at least one software application; and
an storage server coupled to the network, the storage server for providing storage for the client and for allowing the client to access data stored on the storage server using HTTP protocol as though the data was stored locally on the client, wherein when a file is being uploaded from the client software application to the storage server, the file is encoded prior to transmission and decoded by the storage server to eliminate interference by HTTP protocol, wherein the client software application is a presentation tool in a presentation layer, and wherein a client's HTTP file download request triggers a corresponding servlet request, which in turn, issues a storage request to a storage layer, such that the storage layer reads the corresponding file and sends the file back to a application layer, which transforms it into servlet output stream and sends the stream to the client.

2. The system of claim 1 wherein a file upload function reads a file from the client, transforms the file into an encoded ServletInputStream file, transfers the Servelet-InputStream across the network to a file server, which then accepts, decodes the ServerletInputStream, and stores the ServerletInputStream's file contents in the storage server.

* * * * *